United States Patent [19]
Bachofen et al.

[11] 3,981,447
[45] Sept. 21, 1976

[54] RECIRCULATORY APPARATUS FOR SPRAYING MOULD PARTING AGENTS AND OTHER SUBSTANCES

[75] Inventors: Bruno Bachofen, Wettswil; Karl Riedl, Arni-Islisberg, both of Switzerland

[73] Assignee: Siemens-Albis Aktiengesellschaft, Zurich, Switzerland

[22] Filed: Feb. 10, 1975

[21] Appl. No.: 548,465

[30] Foreign Application Priority Data
Feb. 15, 1974 Switzerland............................ 2091/74

[52] U.S. Cl................................ 239/124; 239/412; 239/416; 239/417.3; 417/296
[51] Int. Cl.[2]......................... B05B 9/00; B05B 7/12; F04B 49/00
[58] Field of Search................. 239/125, 416, 416.5, 239/417, 417.3, 8, 412, 88, 92, 124; 417/296, 440

[56] References Cited
UNITED STATES PATENTS

| | | | |
|---|---|---|---|
| 1,322,137 | 11/1919 | Salfeld | 239/125 X |
| 1,492,593 | 5/1924 | Day | 239/8 |
| 2,199,454 | 5/1940 | Andler et al. | 239/125 X |
| 2,488,089 | 11/1949 | Mayo | 239/125 X |
| 2,578,934 | 12/1951 | Janssen | 239/125 |
| 2,634,806 | 4/1953 | Hirtz | 239/125 |
| 2,654,911 | 10/1953 | Sharlip et al. | 239/412 X |
| 3,018,968 | 1/1962 | Levey | 239/124 |

FOREIGN PATENTS OR APPLICATIONS

| | | | |
|---|---|---|---|
| 1,323,192 | 2/1963 | France | 239/124 |
| 420,262 | 11/1934 | United Kingdom | 239/125 |
| 177,817 | 4/1922 | United Kingdom | 239/412 |
| 581,777 | 10/1946 | United Kingdom | 239/124 |

*Primary Examiner*—Robert S. Ward, Jr.
*Attorney, Agent, or Firm*—Benoit Law Corporation

[57] ABSTRACT

Apparatus for spraying mould parting agents and other substances having a conduit for circulating the substance, and spray nozzle equipment having a first bore connected to the conduit for a circulation of the substance therethrough. A second bore in the equipment intersects the first bore at an angle and extends to a spraying device. A nozzle pin in the second bore has a third bore for supplying a pressurized medium to the spraying device and is adjustable for a regulation of the supply of circulated substance to the spraying device. Additionally or alternatively, part of a conduit for circulating a sprayable substance is connected to a pump submerged in a supply of that substance and is actuated for actuating the submerged pump.

12 Claims, 4 Drawing Figures

RECIRCULATORY APPARATUS FOR SPRAYING MOULD PARTING AGENTS AND OTHER SUBSTANCES

BACKGROUND OF THE INVENTION

1. Field of the Invention

The present invention relates to the spraying of mould parting agents and other substances and, more specifically, to apparatus for the automatic, uniform application of a mould parting agent to a die mould in an injection die casting system, and to other spraying equipment.

2. Description of the Prior Art

Injection die casting is generally employed for the mass production of components from thermoplastic synthetics. The thermoplastic mass is extruded in an automatic die casting machine at a high pressure in liquid form through a nozzle into a cooled die casting mould or permanent mould. The process permits the production of components of many different shapes which require little or no subsequent processing.

Frequently the demoulding i.e. the removal of the injection cast components from the die mould presents difficulties. In dependence upon the nature of the synthetic which is used and the shape of the die cast component, said component will remain stuck to the mould and therefore often can be removed from the mould only with much effort. Thus for example components of conical shape can be removed more simply than those having parallel faces or surface lines such as e.g. prismatic or cylindrical components. In dependence upon the nature of the synthetic material it is also possible that the surface of the injection case component which is in contact with the die mould will suffer damage when being removed from the mould.

These difficulties cast doubts upon the question of automation of the demoulding process. It has been proved that the aforementioned difficulties can be successfully overcome by spraying a suitable substance onto the die mould in each case prior to the casting process. Such substances generally known as mould parting agents, are known; thus e.g. zinc stearate which is obtainable in powder form. The substance employed as mould parting agent must be compatible both with the die mould and with the synthetic material employed. In addition the parting agent which is sprayed onto the die mould must uniformly cover the surface of said mould and be able to be applied in a specific concentration. In addition a spraying device is required which will atomize the mould parting agent in such a way that on impact it will be deposited as a thin layer in the mould.

The simplest known spraying devices for manual use are for example the clyster ball, the spray nozzle or the spray gun. These instruments possess substantial disadvantages however, and their use is relatively expensive. Thus it is necessary to intervene into the casting process at specific intervals to exert an operative force on the die casting machine and the die mould must be sprayed with the parting agent. This intervention causes an additional outlay of time in production. As the aforesaid simple devices are also liable to disturbances i.e. generally tend to obstructions of the spray elements such as e.g. the nozzles, uniform spraying of the mould is not guaranteed which has a negative effect on the quality of the die cast components which are produced and can occasionally lead to a high reject quota.

Summary of the Invention

It is an object of this invention to provide improved apparatus for spraying substances. It is also an object of this invention to provide improved apparatus which eliminate the above mentioned disadvantages and enable the demoulding process to be integrated into an automatic casting process. From one aspect thereof, the subject invention resides in apparatus for spraying a sprayable substance, comprising, in combination, means including a conduit for circulating the substance, and means including a first bore connected in the conduit for a circulation of the substance through the bore, a spraying device, a second bore intersecting the first bore at an angle and extending to the spraying device, and means for supplying a pressurized medium to the spraying device, including a nozzle pin extending in the second bore and having a third bore for supplying the pressurized medium to the nozzle device, and means for regulating the supply of the circulated substance from the first bore to the spraying device, including means connected to the nozzle pin for varying the position of the nozzle pin in the second bore.

From another aspect thereof, the subject invention resides in apparatus for spraying a sprayable substance, comprising, in combination, means for containing a supply of the substance, means including a conduit for circulating a substance from the supply, means connected in the conduit for spraying part of the circulated substance, and means for pumping the substance from the supply to the spraying means, including a pump, means for submerging the pump in the supply including a predetermined part of the conduit, and means connected to the predetermined part of the conduit for actuating the pump via the part of the conduit.

BRIEF DESCRIPTION OF THE DRAWINGS

A preferred embodiment of the subject invention will be described by way of example in the following description, illustrated by the accompanying drawings, in which:

FIG. 2a1 is a longitudinal section through a spraying device embodying the subject invention and used in the apparatus of FIG. 1;

FIG. 2a2 is a view similar to FIG. 2a1 showing the spraying device in an open state.

DESCRIPTION OF PREFERRED EMBODIMENTS

Figure 1:
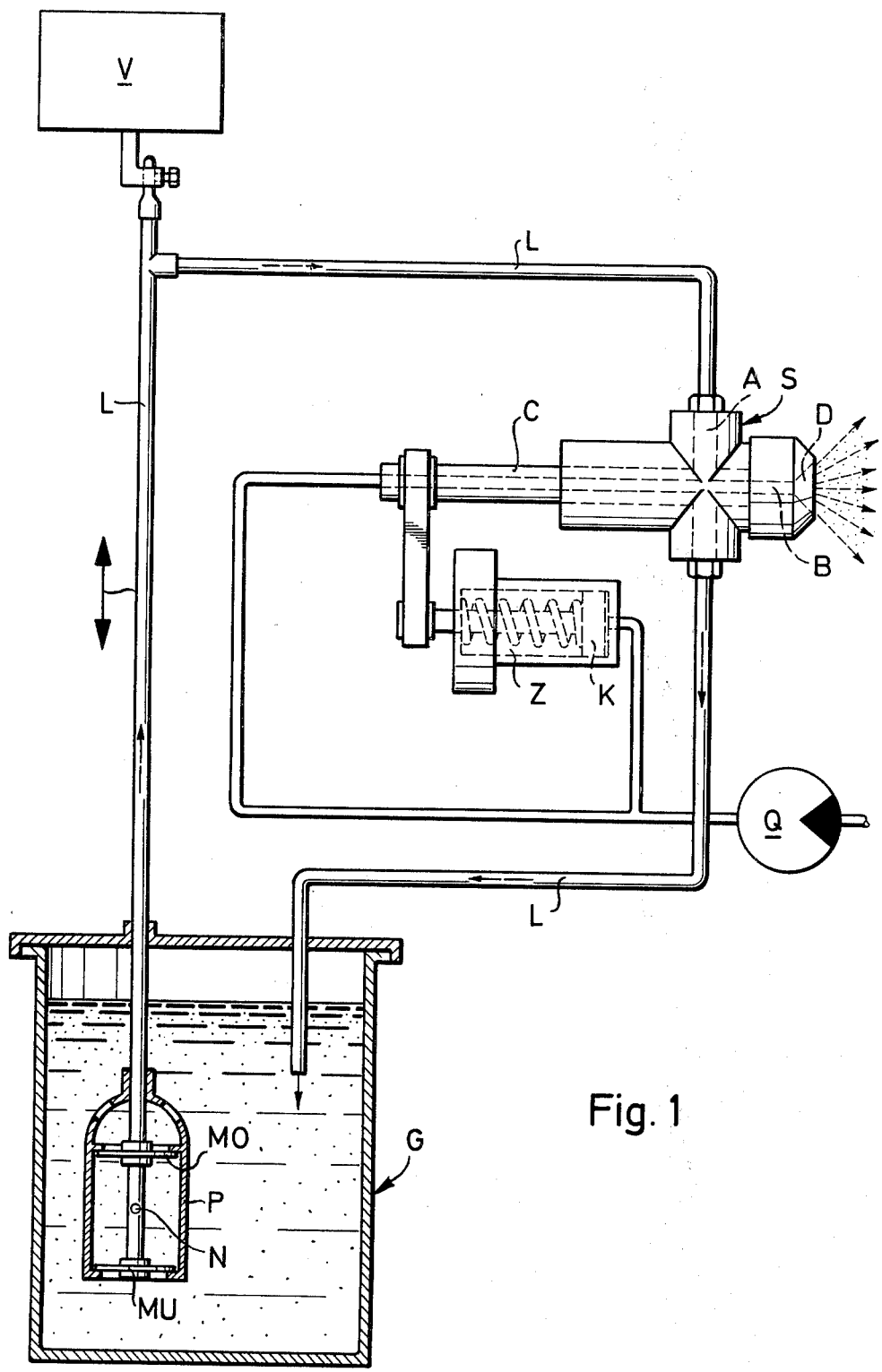
FIG. 1 is a somewhat diagrammatic side view, partially in section, of a spraying apparatus in accordance with a preferred embodiment of the subject invention.

In FIG. 1 the container G contains the suspension which is composed of the powdered mould parting agent and a highly volatile liquid. The two components of the suspension are in a specific quantity ratio to one another. The arrangement which on the one hand ensures the constant mixing of the parting agent to the liquid and on the other hand ensures that a cycle is maintained consists in the present exemplary embodiment of a membrane pump P which is submerged into the suspension and of a vibrator V rigidly connected to said pump. The vibrator V causes the pump P to constantly move back and forth in the vertical direction.

Naturally other means capable of fulfilling the aforesaid functions are conceivable in addition to this arrangement which is distinguished by its simple construction.

In explanation of the influence of the vibrator movement, the construction and mode of operation of the membrane pump P known per se will here be briefly described. The pump chamber is formed by the actual pump housing and by two membranes MO, MU. Means are provided which ensure that the upper membrane MO connects the pump chamber to the exterior only as a result of a pressure to which it is subjected from above and corresponding deformation, whilst the opposite applies to the lower membrane MU, i.e. the membrane MU permits a connection between exterior and pump chamber only as a result of a pressure exerted from below.

Figure 2B:
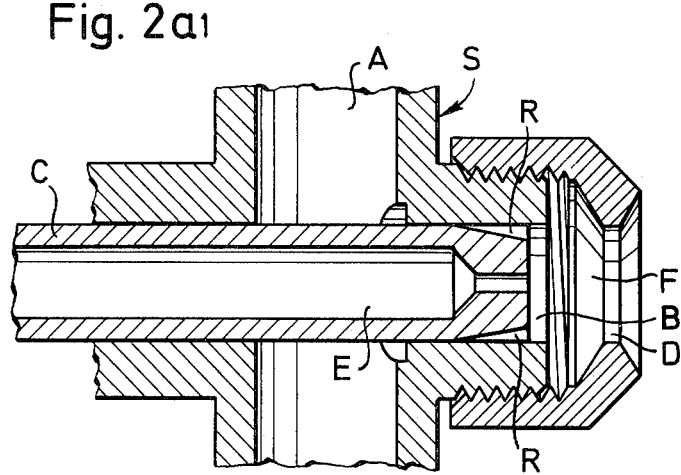
FIG. 2b is an elevation of an end portion of an element of the spraying device shown in FIGS. 2a1 and 2a2 as seen in the direction of the arrow IIb in FIG. 2a2.
Figure 2B:
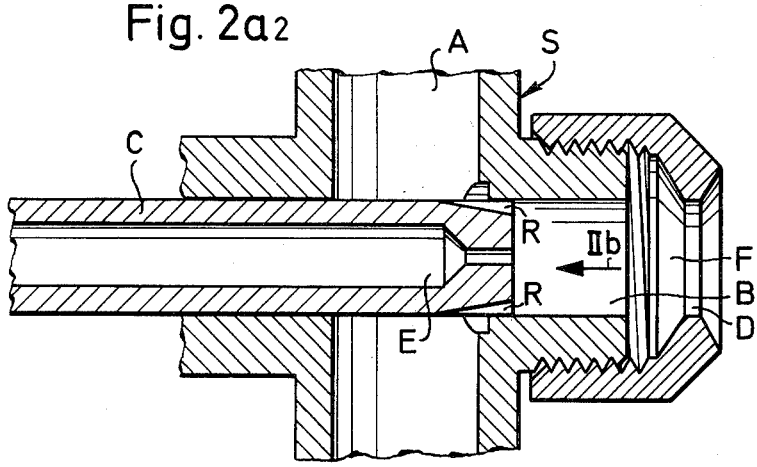
Figure 2B:
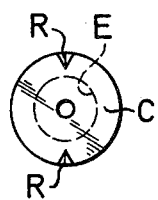

If, now, as provided in the present spraying device, the membrane pump P constantly moves up and down, the two membranes MO, MU will alternately allow suspension into the pump chamber from where the latter can only emerge through an opening N into a recirculating line L, which forms a closed loop from the suspension in the container G back to that suspension. In this recirculating line L the suspension is conducted back into the container G through a spraying element S. The combination of the vibrator V with the membrane pump P thus maintains a cycle which constantly supplies the spraying element S with the mould parting agent in a constant concentration. Preferably a part of the recirculating line L forms the rigid connecting element between vibrator V and membrane pump P.

FIG. 2*a*1 and FIG. 2*a*2 illustrate an embodiment of the spraying element S in an example in a longitudinal section. The spraying element is shown in FIG. 2*a*2 in the open state and in FIG. 2*a*1 in the closed state. The element possesses two bores arranged at right angles to one another whose axes intersect each other and each form a channel A, B.

The diameter of the channel A is larger than that of the channel B. The channel A is connected on both sides to the ring line L in the spraying device. At one end the channel B possesses an opening which forms the outlet opening D of the spraying element S. At the point at which the part of the channel B which exhibits the outlet opening D opens into the channel A the diameter of the channel B is enlarged. The channel B contains a cylindrical nozzle pin C which may be displaced in the longitudinal direction of the channel and which possesses an axial bore E. The nozzle pin C and the channel B have congruent cross-sections as seen in FIGS. 2*a*1 and 2*a*2. The end of the bore E in the nozzle pin C which faces the outlet opening D of the spraying element S is of nozzle shape by defining a nozzle like constriction; the other end of the bore E is connected to a compressed air source Q which also acts upon an air cylinder Z whose piston is rigidly connected to the nozzle pin C (FIG. 1). In addition the nozzle pin C is provided with two grooves R as can be seen from FIG. 2b. Commencing from the end facing the outlet opening D these grooves R run axially parallel on the surface of the nozzle pin C, their depth decreasing with increasing length. Their length is selected to be such that when the spraying element S is closed i.e. when the nozzle pin C is fully inserted, the channel A and the cavities formed by the grooves R are not connected to each other.

The mode of operation of the illustrated device and of the spraying element S in particular is as follows: The constant circulation of the suspension and the cycle which is thus maintained constantly conducts liquid through the channel A of the spraying element S. When the pin C is fully inserted, the suspension within the spraying element S flows around the pin C and passes back into the container G.

The spraying process is triggered by a surge of compressed air from the compressed air source Q, which influences the piston K in the air cylinder Z in such manner that the nozzle pin C is axially displaced or moved away from the outlet opening D of the spraying element S. Thus in the channel B a free space is formed in front of the outlet opening D. In addition the displacement of the nozzle pin C produces a connection, formed by the grooves R, between the free space and the channel A. The aforesaid surge of compressed air also produces a flow of air in the axial direction through the nozzle pin C and an under-pressure zone is thus formed in the free space in front of the outlet opening D. The nozzles which are formed by the grooves R with the inner wall of the channel B enable the suspension to emerge from the channel A into the free space of channel B. Here the suspension is mixed with the flow of air by the effects of the under-pressure and sprayed out with this flow of air through the outlet opening D. The nozzles formed after the opening of the spraying element S by the grooves R are characterised by the fact that the cross-section of the nozzle constriction is variable in dependence upon the degree of opening of the spraying element S. The constant opening and closing of these nozzles and the increase in cross-section in the direction of flow produced by the grooves R ensures a self-cleansing action and the danger of obstruction which exists in conventional nozzles is here eliminated.

A further advantage consists in the fact that with the aid of simple means the cross-section of the flow channel of this nozzle can be changed and adjusted to a specific size. For example, this can be achieved in that the maximum displacement path of the nozzle pin C is predetermined with an adjustable lock or stop. By means of an appropriate formation of the outlet opening D and an appropriate arrangement of the spraying element S it is possible to uniformly spray a die mould located in the air jet issuing from the spraying element S and being enriched with the suspension. As a result of the considerable excess of air in the air jet, there is a fine distribution of the suspension so that the liquid which acts as carrier is quickly volatilized and the die mould is coated only with the mould parting agent.

The process in accordance with the invention and the spraying device for the execution thereof offer the advantage that the uniform application of a parting agent to a die mould is ensured and the danger of the obstruction of the spraying device due to the sedimentation of the parting agent is eliminated. As the spraying device is service-free, it can easily be integrated into an automatic die casting system. Thus the die-cast articles can be automatically demoulded with a suitable ejection device also. The proposed spraying element S also permits a desired dosing of the mould parting agent, which is to be sprayed on, to be carried out in simple manner. This can be effected by the selection of suitable sizes for the grooves R and/or by the selection of the quantity of compressed air supplied to the spraying element S. A fine setting of the spray element S can additionally be provided with simple mechanical means. The spraying element S illustrated in FIG. 2 does not necessarily require to be pneumatically operated. Naturally the operation can for example also take place with mechanical or electromechanical means in which case the double function of the compressed air source Q is dispensed with. It is also obvious that the use of the spraying device proposed for the execution of the process in accordance with the invention is not confined to die casting systems. Its use is conceivable wherever a surface is to be uniformly coated with a substance, preferably with a substance in a suspension.

We claim:

1. Apparatus for spraying a sprayable substance, comprising in combination:
    means including a conduit for circulating said substance; and
    means including a first bore connected in said conduit for a circulation of said substance through said bore, a spraying device, a second bore intersecting said first bore at an angle and extending to said spraying device, and means for supplying a pressurized medium to said spraying device, including a nozzle pin extending in said second bore and having a third bore for supplying said pressurized medium to said nozzle device, and means for regulating the supply of said circulated substance from said first bore to said spraying device, including means connected to said nozzle pin for varying the position of said nozzle pin in said second bore.

2. Apparatus as claimed in claim 1, wherein:
    said second bore intersects said first bore at right angles.

3. Apparatus as claimed in claim 2, wherein:
    said nozzle pin is axially displaceable in said second bore.

4. Apparatus as claimed in claim 3, wherein:
    said nozzle pin and said second bore have congruent cross-sections.

5. Apparatus as claimed in claim 4, wherein:
    said nozzle pin defines a nozzle-like constriction in said third bore adjacent said spraying device.

6. Apparatus as claimed in claim 4, wherein:
    said nozzle pin has an end portion adjacent said spraying device having axially extending grooves with cross-sections increasing toward said spraying device.

7. Apparatus as claimed in claim 4, wherein:
    said nozzle pin has an end portion adjacent said spraying device and a wall portion of said second bore forming self-cleaning nozzle elements for said circulated suspension.

8. Apparatus as claimed in claim 6, wherein:
    said means for varying the position of said nozzle pin include means connected to said nozzle pin and to said pressurized medium supplying means for actuating said nozzle pin with part of said pressurized medium.

9. Apparatus as claimed in claim 1, wherein:
    said means for circulating said substance include means for containing a supply of said substance, a pump, means for submerging said pump in said supply including a predetermined part of said conduit, and means connected to said part of said conduit for actuating said pump via said part of said conduit.

10. Apparatus as claimed in claim 1, wherein:
    said means for circulating said substance include means for containing a supply of said substance, a membrane pump, means for submerging said membrane pump in said supply including a predetermined part of said conduit, and means connected to said part of said conduit for actuating said membrane pump via said part of said conduit.

11. Apparatus for spraying a sprayable substance, comprising in combination:
    means for containing a supply of said substance;
    means including a conduit for circulating a substance from said supply;
    means connected in said conduit for spraying part of said circulated substance; and
    means for pumping said substance from said supply to said spraying means, including a pump, means for submerging said pump in said supply including a predetermined part of said conduit, and means connected to said predetermined part of said conduit for actuating said pump via said part of said conduit.

12. Apparatus as claimed in claim 11, wherein:
    said actuating means include means for vibrating said predetermined part of said conduit; and
    said pump comprises a vibration actuated membrane pump connected to said part of said conduit.

* * * * *